United States Patent
Nousiainen

(10) Patent No.: US 8,035,535 B2
(45) Date of Patent: Oct. 11, 2011

(54) APPARATUS AND METHOD PROVIDING TRANSFORMATION FOR HUMAN TOUCH FORCE MEASUREMENTS

(75) Inventor: Jari O. Nousiainen, Espoo (FI)

(73) Assignee: Nokia Corporation, Espoo (FI)

( * ) Notice: Subject to any disclaimer, the term of this patent is extended or adjusted under 35 U.S.C. 154(b) by 993 days.

(21) Appl. No.: 11/986,487

(22) Filed: Nov. 21, 2007

(65) Prior Publication Data

US 2009/0127004 A1    May 21, 2009

(51) Int. Cl.
*H03M 7/00* (2006.01)

(52) U.S. Cl. ............................. 341/50; 341/51; 341/155

(58) Field of Classification Search .............. 341/50–51, 341/155
See application file for complete search history.

(56) References Cited

U.S. PATENT DOCUMENTS

| | | | | |
|---|---|---|---|---|
| 5,376,948 | A | * | 12/1994 | Roberts .......................... 345/173 |
| 5,854,625 | A | * | 12/1998 | Frisch et al. ................... 345/173 |
| 5,920,274 | A | | 7/1999 | Gowda et al. .................. 341/155 |
| 6,113,642 | A | | 9/2000 | Petrofsky et al. ............... 623/24 |
| 6,504,530 | B1 | | 1/2003 | Wilson et al. .................. 345/173 |
| 7,196,694 | B2 | * | 3/2007 | Roberts .......................... 345/173 |

OTHER PUBLICATIONS

"Making an Impression: Force-Controlled Pen Input for Handheld Devices", S. Mizobuchi et al., Late Breaking Results: Posters, CHI, Apr. 2-7, 2005 Portland, Oregon, pp. 1661-1664.

"Sensing Pressure for Authentication", N. Henderson et al., Proc. 3$^{rd}$ IEEE Benelux Signal Processing Symposium (SPS-2002), Leuven, Belgium, Mar. 21-22, 2002, pp. S02-1-S02-4.

"Evaluating Different Touch-Based Interaction Techniques in a Public Information Kiosk", R. Raisamo, Department of Computer Science, University of Tampere, PO Box 607, FIN-33101 Tampere, Finland.

"Human Performance in Controlling Normal Forces of Contact with Rigid Objects", M. Srinivasan et al., DSC-vol. 49, Advances in Robotics, Mechatronic, and Haptic Interfaces ASME 1993, pp. 119-125.

"Pressure Widgets", G. Ramos et al., CHI, Apr. 24-29, 2004, Vienna, Austria, vol. 6, No. 1, pp. 487-494.

* cited by examiner

*Primary Examiner* — Khai M Nguyen
(74) *Attorney, Agent, or Firm* — Harrington & Smith

(57) ABSTRACT

An apparatus includes a force sensor configured to be activated by a user and a control unit connected to an output of the force sensor. The control unit is configurable to operate in response to receipt of an m-bit value representing a measurement from the force sensor to transform the m-bit value to an n-bit transformed value, where n<m, and where the transformed value encodes an identification of one of a plurality of force ranges and contains a force measurement value within the identified one of the plurality of force ranges.

25 Claims, 4 Drawing Sheets

| MODE | MEASURED VALUE → | CORRECTED VALUE |
|---|---|---|
| 00h | 0000000xxxxx | 000xxxxx (LOW FORCES) |
| 01h | 0000001xxxxx | 001xxxxx |
| 02h | 000001xxxxxy | 010xxxxx |
| 03h | 00001xxxxxyy | 011xxxxx |
| 04h | 0001xxxxxyyy | 100xxxxx |
| 05h | 001xxxxxyyyy | 101xxxxx |
| 06h | 01xxxxxyyyyy | 110xxxxx |
| 07h | 1xxxxxyyyyyy | 111xxxxx (HIGH FORCES) |

INPUT TO CONDITIONING UNIT 16 — OUTPUT FROM CONDITIONING UNIT 16

FIG.3

4A — PROVIDING AN M-BIT VALUE REPRESENTING A MEASUREMENT FROM A FORCE SENSOR ACTIVATED BY A USER OF A DEVICE

4B — TRANSFORMING THE M-BIT VALUE TO AN N-BIT TRANSFORMED VALUE, WHERE N<M, AND WHERE THE TRANSFORMED VALUE ENCODES AN IDENTIFICATION OF ONE OF A PLURALITY OF FORCE RANGES AND CONTAINS A FORCE MEASUREMENT VALUE WITHIN THE IDENTIFIED ONE OF THE PLURALITY OF FORCE RANGES

FIG.4

APPARATUS AND METHOD PROVIDING TRANSFORMATION FOR HUMAN TOUCH FORCE MEASUREMENTS

TECHNICAL FIELD

The exemplary and non-limiting embodiments of this invention relate generally to user input systems, methods, devices and computer program products and, more specifically, relate to techniques for sensing and representing an amount of force applied to a touch sensitive haptic user interface input device.

BACKGROUND

As user interfaces evolve there is a growing interest in, and use of, touch sensitive devices that are capable of generating an output signal that represents an amount of force applied to the device by a user. These types of devices can be contrasted to conventional force-activated user input devices, such as pushbutton and similar switches, that essentially simply indicate that the user has applied a sufficient amount of force to activate the switch, and no more.

Representative publications include the following: "Evaluating Different Touch-based Interaction Techniques in a Public Information Kiosk", Roope Raisamo, Technical Report of University of Tampere, A-1999-11 (1999); "Making an Impression: Force-Controlled Pen Input for Handheld Devices", Sachi Mizobuchi, Shinya Terasaki, Turo Keski-Jaskari, Jari Nousiainen, Matti Ryynanen, Miika Silfverberg, CHI 2005, Apr. 2-7, 2005, Portland, Oreg., USA; "Pressure Widgets", Gonzalo Ramos, Matthew Boulos, Ravin Balakrishnan, CHI 2004, Apr. 24-29, 2004, Vienna, Austria; "Sensing Pressure for Authentication", Neil Henderson, Neil White, Raymond Veldhuis, Pieter Hartel, Kees Slump, Proc. 3rd IEEE Benelux Signal Processing Symposium (SPS-2002), Leuven, Belgium, Mar. 21-22, 2002; and "Human Performance in Controlling Normal Forces of Contact with Rigid Objects", Mandayam A. Srinivasan, Jyh-shing Chen, DSC-Vol. 49, Advances in Robotics, Mechatronics and Haptic Interfaces, ASME 1993.

There are several problems inherent in the use of conventional force sensitive user input devices. These problems relate generally to the fact that a user's force sense is not linear, and furthermore is not uniform across a given population of users.

SUMMARY OF THE EXEMPLARY EMBODIMENTS

The foregoing and other problems are overcome, and other advantages are realized, in accordance with the non-limiting and exemplary embodiments of this invention.

In a first aspect thereof the exemplary embodiments of this invention provide a method that includes providing an m-bit value representing a measurement from a force sensor activated by a user of a device, and transforming the m-bit value to an n-bit transformed value, where n<m, and where the transformed value encodes an identification of one of a plurality of force ranges and contains a force measurement value within the identified one of the plurality of force ranges.

In a further aspect thereof the exemplary embodiments of this invention provide a computer-readable memory medium storing computer program instructions the execution of which results in operations that comprise inputting an m-bit value representing a measurement from a force sensor activated by a user of a device; and transforming the m-bit value to an n-bit transformed value, where n<m, and where the transformed value encodes an identification of one of a plurality of force ranges and contains a force measurement value within the identified one of the plurality of force ranges.

In another aspect thereof the exemplary embodiments of this invention provide an apparatus that includes a force sensor configured to be activated by a user and a control unit connected to an output of the force sensor. The control unit is configurable to operate in response to receipt of an m-bit value representing a measurement from the force sensor to transform the m-bit value to an n-bit transformed value, where n<m, and where the transformed value encodes an identification of one of a plurality of force ranges and contains a force measurement value within the identified one of the plurality of force ranges.

In another aspect thereof the exemplary embodiments of this invention provide an apparatus that includes means for providing an m-bit value representing a measurement from a force sensor activated by a user, and means for transforming the m-bit value to an n-bit transformed value, where n<m, and where the transformed value encodes an identification of one of a plurality of force ranges and contains a force measurement value within the identified one of the plurality of force ranges, where the identification is encoded using a most significant bits of the transformed value, and where the force measurement value is contained in n-a least significant bits of the transformed value.

BRIEF DESCRIPTION OF THE DRAWINGS

The foregoing and other aspects of the teachings of this invention are made more evident in the following Detailed Description, when read in conjunction with the attached Drawing Figures, wherein:

FIG. 3 shows a non-limiting example of the transformation of an m-bit value representing a measurement from the force sensor to an n-bit transformed value, where n<m, and where the transformed value encodes an identification of one of a plurality of force ranges and contains a force measurement value within the identified one of the plurality of force ranges.

FIGS. 4, 5 and 6 are each a logic flow diagram descriptive of a method, and the result of execution of computer program code, in accordance with the exemplary embodiments of this invention.

DETAILED DESCRIPTION

The exemplary embodiments of this invention are concerned with a force sensor that provides, for example, 12-bit resolution, at least in a linear measurement. However, 12-bit information requires significantly more processing power than 8-bit information since many data processors typically operate with bytes (8-bits) and even multiples of bytes. Further, and as was noted above, human force sense is not linear. As a result, when applying a higher force level the resolution differs from what it would be at a lower force level. As such, a greater amount of resolution is desirable when measuring low forces. In addition, it has been found that when measuring force levels that some of the output bits actual indicate noise (force noise) generated by the user. As is known in the art a typical human subject can controllably apply about only about 10 different force levels. Further, the actual force applied at each level can differ significantly between subjects. The end result is that the force measurement input device should ideally operate over a wide dynamic range to be usable with a broad and diverse population of users.

Figure 1:
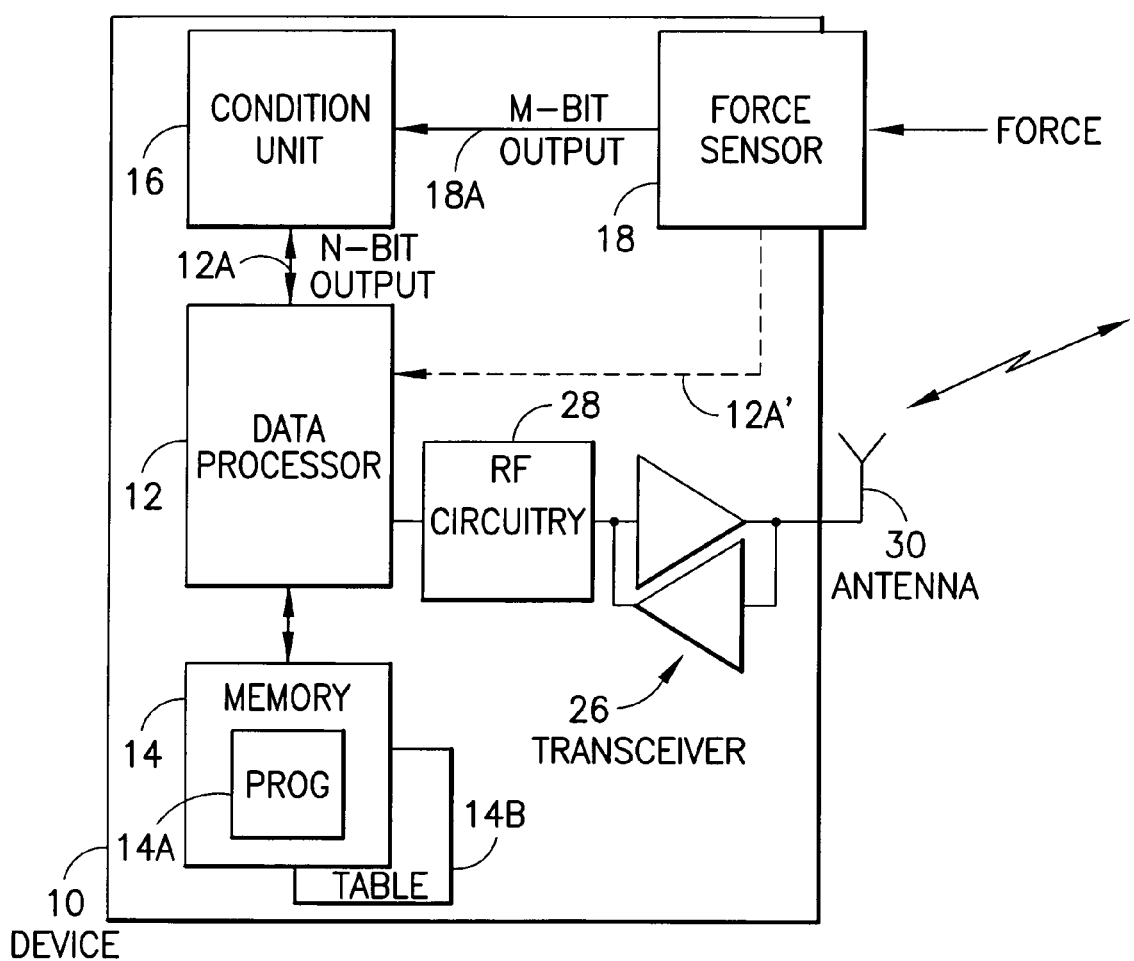
FIG. 1 is a block diagram of a device constructed and operated in accordance with the exemplary embodiments of this invention.

Reference is made to FIG. 1 for illustrating a simplified block diagram of a non-limiting embodiment of an electronic device 10 that is suitable for use in practicing the exemplary embodiments of this invention. The device 10 includes a control unit, such as a microcontroller or data processor 12 that is coupled or connected with at least one memory 14. The memory 14 stores a program (PROG) 14A of computer program instructions for directing the operations of the data processor 12, including operations that implement the exemplary embodiments of this invention as described below. The device 10 may also include a force measurement conditioning function or unit 16 that receives an input 18A representing m-bit information from a force sensor 18 disposed on or in, or otherwise is coupled to the device 10. The force measurement conditioning unit 16 transforms the m-bit information to n-bit information, where n<m, and provides an output signal 12A to the data processor 12. In an alternate embodiment the force measurement conditioning unit 16 may not be present, and the force sensor 18 may provide an output 12A' directly to the data processor 12. In this latter embodiment the data processor 12 performs the functions of the force measurement conditioning unit 16.

As a non-limiting example, m=12 and n=8.

The force sensor 18 may be embodied in many different forms. As one non-limiting example the force sensor 18 may be embodied in a touch sensitive display screen that responds to pressure applied by a user's finger or by a stylus. In another non-limiting embodiment the force sensor 18 may be embodied in a stylus having a deflectable or deformable tip portion that generates an output when pressed against a surface. In another non-limiting embodiment the force sensor 18 may be embodied with a push button switch or membrane or dome that outputs a signal indicating an amount of force applied by a user's finger, or it may be embodied in a joystick-type device. The force sensor 18 is assumed to be disposed relative to the device 10 so that a user is able to exert a force on the force sensor 18. Note that in some embodiments the force sensor 18 may be tethered to the device 10 through a cable, such as when the force sensor 18 is embodied in a force-sensing stylus. In another embodiment the force sensor 18 may be wirelessly coupled to the device 10 using, for example, a low power RF link (e.g., a Bluetooth™ link) or an infrared (IR) link. All of these possible embodiments are merely exemplary, and are not intended to be construed in a limiting fashion with regards to the many possible forms that the force sensor 18 may assume.

Note that the device 10 may also include at least one wireless interface, such as a radio frequency (RF) transceiver 26 that is connected with RF circuitry 28 and at least one antenna 30. For example, the device 10 may be a cellular phone that includes the force sensor 18 as a user input device.

In general, the various embodiments of the device 10 can include, but are not limited to, cellular telephones, personal digital assistants (PDAs), portable computers, image capture devices such as digital cameras, gaming devices, music storage and playback appliances, Internet appliances, as well as portable units or devices that incorporate combinations of such functions.

The exemplary embodiments of this invention may be implemented at least in part by computer software executable by the data processor 12, or by hardware, or by a combination of software and hardware. This applies also to the conditioning unit 16, which may be implemented in hardware, or as software executed by the data processor 12, or as a combination of hardware and software. Note that the operation of the conditioning unit 16 may be accomplished at least in part through the use of a look-up table (LUT), shown for convenience and not as a limitation as the table 14B in FIG. 1. In this embodiment the m-bit output of the force sensor 18 may be used to address the LUT to retrieve a corresponding n-bit value.

The memory 14 may be of any type suitable to the local technical environment and may be implemented using any suitable data storage technology, such as semiconductor-based memory devices, flash memory, magnetic memory devices and systems, optical memory devices and systems, fixed memory and removable memory. The data processor 12 may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention exploit the ability of a human subject (a user of the device 10) to distinguish between different levels of low force, and the inability of the user to distinguish between different levels of higher forces. A low force result may be used in the control of the device 10, while a high force result may be used to prevent the device 10 from being damaged by the excessive use of force, such as by providing a feedback signal to the user.

The exemplary embodiments of this invention extend user input dynamics to operate well with touch force recognition systems, and in one aspect thereof address the problem of how best to generate sufficient dynamic information from a linear force detector so as to present the dynamic information as 8-bit data. An aspect of this invention is thus a coding (and compression) technique for use with the force sensor 18 when it receives user touch forces. Even more generally, an aspect of this invention relates to a technique to transform m-bit data generated by the force sensor 18 to n-bit data for convenient use by the data processor 12, without sacrificing the user touch dynamic information represented by the m-bit data, particularly at low force levels.

Assuming as a non-limiting example that the linear force measuring device embodied in the force sensor 18 generates 12-bit data, then the conditioning unit 16 performs compression/coding to place the output into an 8-bit format. A consideration when performing this task is that when generating higher forces the user may generate a higher level of force noise as well. For example, approximately 20% of the higher force may be noise. As such, the output signal 18A from the force sensor 18 with a 5 Newton (N) force applied actually contains about a 1N noise component, while a signal representing a 0.5 N applied force contains only about a 0.1 N noise component. As a result it can be appreciated that the measurement resolution need not be as great when measuring a high force as when measuring a lower force.

The exemplary embodiments of this invention provide a signal transformation for human touch force measuring systems. As was noted, human force sense can be very sensitive and accurate at low levels of force. In fact, human force sense is generally logarithmic as shown in trace A of FIG. 2. Under normal conditions in the high force area there are few non-meaningful bits available in the measured results.

Figure 2:
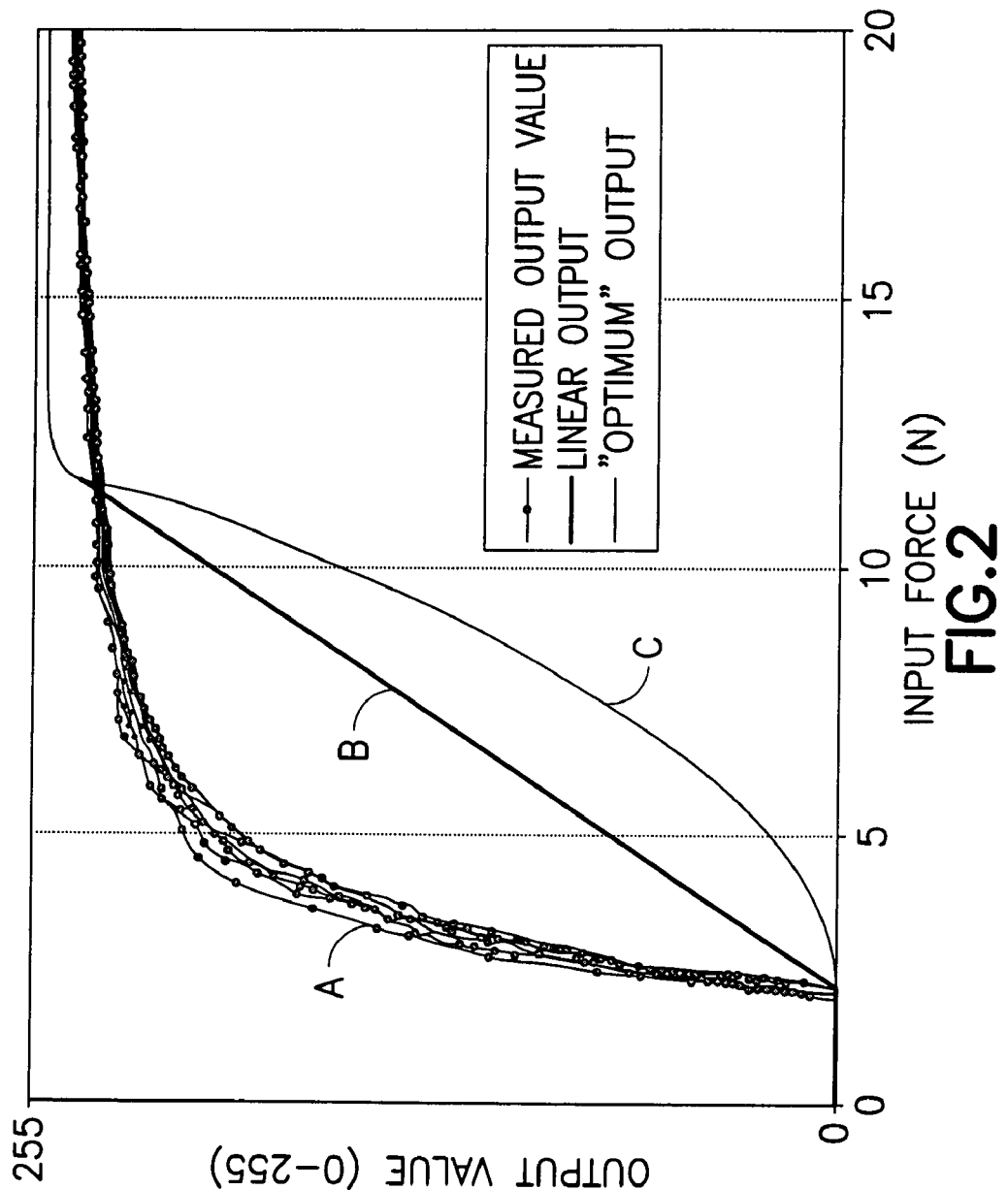
FIG. 2 is a graph that illustrates the shape of several exemplary curves, including a measured response curve from a force sensor, and two embodiments of transformed response curves.

More specifically, trace A in FIG. 2 shows a non-limiting and exemplary measurement of the force sensor 18 response. After activation of the sensor 18 at about 2 N of applied force the output rises rapidly and reaches a maximum value at about 6-8 N (without saturating). As there is no saturation the user may be encouraged to apply excessive force which, if sufficiently great, may damage the force sensor 18. As can be appreciated, the use of the raw output data form the force sensor 18 is less than desirable, and can create problems. As can be noted, in a low input force region of particular interest for many fine-control applications (from about 2 N to about 3 N) the corresponding force sensor output values rise very rapidly, resulting in a possible loss of control-related information.

In accordance with the exemplary embodiments of this invention the conditioning unit 16 transforms the raw output data of the force sensor 18 to provide a non-logarithmic curve shape, such as a generally linear shape (trace B in FIG. 2) or, even more preferably, a generally polynomial-type curve, such as a second order polynomial curve as shown in trace C that may be deemed to be an optimal response curve.

In FIG. 2, which shows the output values in the range of 0-255 (8-bits), the characteristics of the linear curve of trace B are:

$$y=\min(255,(\max(x, 2)-2)*25);$$

while the characteristics of the optimal curve of trace C are:

$$y=\min(255,(\max(x, 2)-2)^2*2.5).$$

It is noted that the curves shown in FIG. 2 are not meant to impose any type of limitation upon the teachings of this invention. For example, the curve A represents an output measured form a certain type of force sensor with a certain type of electrical connection. In this non-limiting example the force sensor used was one commercially available from Panasonic as a force sensitive joystick based on a semiconductive polymer material having a characteristic electrical resistance that decreases when compressed. The curve of B depicts an output of a certain linear type of force measurement sensor, such as one based on a piezo-electric effect, and is provided to show one possible result of the operation of the conditioning unit 16 when receiving a generally logarithmic measurement result of a type shown in curve A. The exemplary curve C is also provided to show a non-limiting example of a non-logarithmic curve shape that is one possible result of the operation of the conditioning unit 16 of FIG. 1.

FIG. 3 illustrates a non-limiting embodiment of an algorithm executed by the conditioning unit 16 for transforming the measured value from the force sensor 18 (assumed here to be a 12-bit output from an analog-to-digital converter that may form a part of the force sensor 18) to a corresponding 8-bit value that can be readily processed by the data processor 12. In this example eight modes (eight force ranges) are considered (0-7, with mode 0 being a lowest range of forces and mode 7 being a highest range of forces). In each mode range the corresponding transformed 8-bit output has five least significant bits (LSBs, xxxxx) obtained directly from the measured output value. In the two lowest force mode ranges these five LSBs are obtained directly from the five LSBs of the measured output value, while in the higher force range modes the five LSBs are obtained directly from five intermediate bits of the measured output values. Those bits marked as "y" in the measured output value are not used (discarded) in the 8-bit representation. Discarding these bits in the higher forces range modes effectively filters force noise from the transformed 8-bit value, with higher force range modes experiencing greater filtering than lower force range modes (except for the two lowest force ranges, where no filtering is performed). The three most significant bits (MSBs) of the transformed 8-bit value directly encode the identification of the applicable mode of the eight possible modes (000-111).

The eight modes are distinguished by a change of state of a next most significant bit after those five bits (xxxxx) in the measured output value that are directly represented in the corresponding 8-bit output value. As can be appreciated, any given one of the 8-bit values directly encodes one of a plurality of applicable force ranges (modes), and also contains one of 32 (represented by 5-bits) force measurement values within that range. Of course, in another embodiment one could encode more or less that eight force ranges (modes), with a corresponding possible change in the number of discrete values that are representable for each range. That is, and by example, in another embodiment one may encode 16 different force ranges (modes) using the four MSBs of the 8-bit value, and represent one of 16 (represented by the four LSBs) force measurement values within each of the 16 ranges.

As should also be appreciated, the transformation technique of FIG. 3 can be readily implemented by use of the look-up table (LUT) procedure, where all (or at least a portion of) the m-bit measured value is used to address the LUT to obtain a corresponding n-bit transformed output.

The exemplary embodiments of this invention thus provide a method that includes, as shown in FIG. 4, at Block 4A providing an m-bit value representing a measurement from a force sensor activated by a user of a device, and at Block 4B transforming the m-bit value to an n-bit transformed value, where n<m, and where the transformed value encodes an identification of one of a plurality of force ranges and contains a force measurement value within the identified one of the plurality of force ranges.

Figure 5:
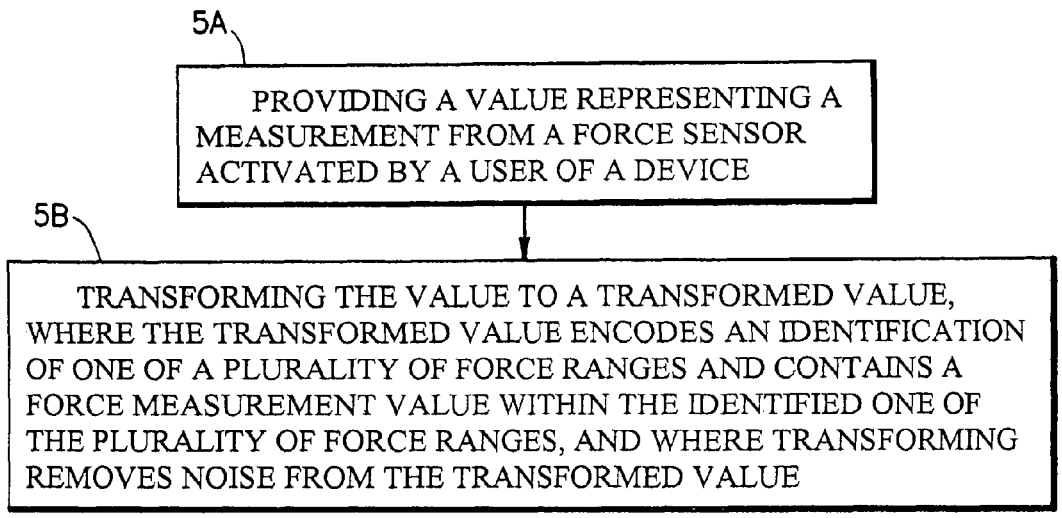

The exemplary embodiments of this invention also provide a method (and corresponding apparatus and computer program) that includes, as shown in FIG. 5, at Block 5A providing a value representing a measurement from a force sensor activated by a user of a device; and (Block 5B) transforming the value to a transformed value, where the transformed value encodes an identification of one of a plurality of force ranges and contains a force measurement value within the identified one of the plurality of force ranges, and where transforming removes noise from the transformed value.

The method, apparatus and computer program as in the preceding paragraph, where more noise is removed from a transformed value in a higher force range than from a transformed value in a lower force range.

Figure 6:
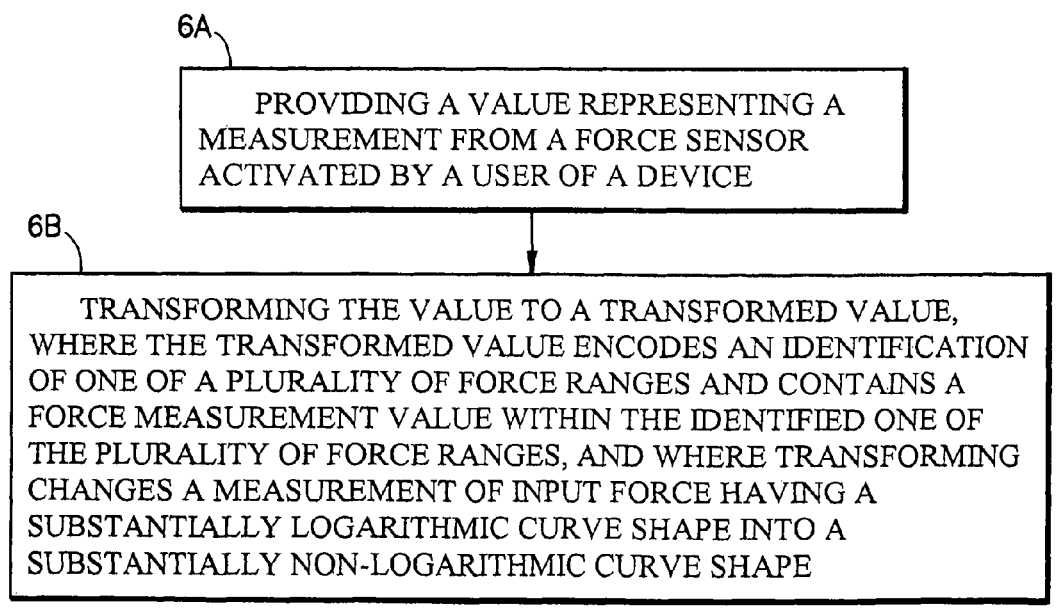

The exemplary embodiments of this invention also provide a method (and corresponding apparatus and computer program) that includes, as shown in FIG. 6, at Block 6A providing a value representing a measurement from a force sensor activated by a user of a device; and (Block 6B) transforming the value to a transformed value, where the transformed value encodes an identification of one of a plurality of force ranges and contains a force measurement value within the identified one of the plurality of force ranges, and where transforming changes a measurement of input force having a substantially logarithmic curve shape into a substantially non-logarithmic curve shape.

The various blocks shown in FIGS. 4, 5 and 6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. As but some examples, the use of other similar or equivalent force sensors may be employed.

Further, it should be noted that it is within the scope of this invention to integrate the functionality of the conditioning unit 16, the LUT (if used) and so forth into the force sensor apparatus itself, and to thereby directly output the transformed n-bit signal as described above.

Note further that the references above to m-bit and n-bit signals should not be construed as implying that parallel data transfer buses need be used, as these signals could be conveyed through serial links as well.

All such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
   providing an m-bit value representing a measurement from a force sensor activated by a user of a device; and
   transforming the m-bit value to an n-bit transformed value, where n<m, and where the transformed value encodes an identification of one of a plurality of force ranges and contains a force measurement value within the identified one of the plurality of force ranges.

2. The method of claim 1, where the identification is encoded using a bits, and where the force measurement value is contained in n-a bits.

3. The method of claim 1, where the identification is encoded using a most significant bits of the transformed value, and where the force measurement value is contained in n-a least significant bits of the transformed value.

4. The method of claim 2, where in at least one force range corresponding to a least amount of force the n-a bits represent n-a least significant bits of the m-bit value, and in at least one force range corresponding to a greater amount of force the n-a bits represent n-a bits of the m-bit value that are intermediate to a least significant bit and to a most significant bit of the m-bit value.

5. The method of claim 4, where for a plurality of force ranges corresponding to increasing amounts of force a number of bits that are intermediate to the n-a bits of the m-bit value and the least significant bit of the m-bit value increases, resulting in one or more least significant bits of the m-bit value not being represented in the n-bit value.

6. The method of claim 1, where transforming further comprises removing noise from the transformed value.

7. The method of claim 1, where n=8.

8. The method of claim 1, where transforming results in changing a substantially logarithmic input force curve to a non-logarithmic force curve.

9. The method of claim 1, where transforming results in changing a substantially logarithmic input force curve to one of a substantially linear or a substantially quadratic force curve.

10. A computer-readable memory medium storing computer program instructions the execution of which results in operations that comprise:
    inputting an m-bit value representing a measurement from a force sensor activated by a user of a device; and
    transforming the m-bit value to an n-bit transformed value, where n<m, and where the transformed value encodes an identification of one of a plurality of force ranges and contains a force measurement value within the identified one of the plurality of force ranges.

11. The memory medium of claim 10, where the identification is encoded using a bits, and where the force measurement value is contained in n-a bits.

12. The memory medium of claim 10, where the identification is encoded using a most significant bits of the transformed value, and where the force measurement value is contained in n-a least significant bits of the transformed value.

13. The memory medium of claim 11, where in at least one force range corresponding to a least amount of force the n-a bits represent n-a least significant bits of the m-bit value, and in at least one force range corresponding to a greater amount of force the n-a bits represent n-a bits of the m-bit value that are intermediate to a least significant bit and to a most significant bit of the m-bit value.

14. The memory medium of claim 13, where for a plurality of force ranges corresponding to increasing amounts of force a number of bits that are intermediate to the n-a bits of the m-bit value and the least significant bit of the m-bit value increases, resulting in one or more least significant bits of the m-bit value not being represented in the n-bit value.

15. The memory medium of claim 10, where the transforming operation further comprises removing noise from the transformed value.

16. The memory medium of claim 10, where n=8.

17. The memory medium of claim 10, where the transforming operation results in changing a substantially logarithmic input force curve to a non-logarithmic force curve.

18. An apparatus, comprising:
   a force sensor configured to be activated by a user; and
   a control unit connected to an output of the force sensor, said control unit configurable to operate in response to receipt of an m-bit value representing a measurement from the force sensor to transform the m-bit value to an n-bit transformed value, where n<m, and where the transformed value encodes an identification of one of a plurality of force ranges and contains a force measurement value within the identified one of the plurality of force ranges.

19. The apparatus of claim 18, where the identification is encoded using a most significant bits of the transformed value, and where the force measurement value is contained in n-a least significant bits of the transformed value, where in at least one force range corresponding to a least amount of force the n-a bits represent n-a least significant bits of the m-bit value, and in at least one force range corresponding to a greater amount of force the n-a bits represent n-a bits of the m-bit value that are intermediate to a least significant bit and to a most significant bit of the m-bit value.

20. The apparatus of claim 19, where for a plurality of force ranges corresponding to increasing amounts of force a number of bits that are intermediate to the n-a bits of the m-bit value and the least significant bit of the m-bit value increases, resulting in one or more least significant bits of the m-bit value not being represented in the n-bit value.

21. The apparatus of claim 18, where said control unit, when transforming the m-bit value, removes noise from the transformed value.

22. The apparatus of claim 18, where n=8.

23. The apparatus of claim 18, where said control unit, when transforming the m-bit value, changes a substantially logarithmic input force curve to a non-logarithmic force curve.

24. An apparatus, comprising:
   means for providing an m-bit value representing a measurement from a force sensor activated by a user; and
   means for transforming the m-bit value to an n-bit transformed value, where n<m, and where the transformed value encodes an identification of one of a plurality of force ranges and contains a force measurement value within the identified one of the plurality of force ranges, where the identification is encoded using a most significant bits of the transformed value, and where the force measurement value is contained in n-a least significant bits of the transformed value.

25. The apparatus of claim 24, where in at least one force range corresponding to a least amount of force the n-a bits represent n-a least significant bits of the m-bit value, and in at least one force range corresponding to a greater amount of force the n-a bits represent n-a bits of the m-bit value that are intermediate to a least significant bit and to a most significant bit of the m-bit value, and where for a plurality of force ranges corresponding to increasing amounts of force a number of bits that are intermediate to the n-a bits of the m-bit value and the least significant bit of the m-bit value increases, resulting in one or more least significant bits of the m-bit value not being represented in the n-bit value and thereby effectively filtering noise from the transformed value.

* * * * *